United States Patent
Han et al.

(10) Patent No.: US 9,839,060 B2
(45) Date of Patent: Dec. 5, 2017

(54) METHOD AND APPARATUS FOR MANAGING DUAL CONNECTION ESTABLISHMENT

(71) Applicant: Avago Technologies General IP (Singapore) Pte. Ltd., Singapore (SG)

(72) Inventors: Jing Han, Beijing (CN); Wei Bai, Beijing (CN); Juho Mikko Oskari Pirskanen, Kangasala (FI); Pengfei Sun, Beijing (CN); Lili Zhang, Beijing (CN); Haiming Wang, Beijing (CN); Xinying Gao, Beijing (CN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/434,046

(22) PCT Filed: Oct. 8, 2012

(86) PCT No.: PCT/CN2012/082546
§ 371 (c)(1),
(2) Date: Apr. 7, 2015

(87) PCT Pub. No.: WO2014/056130
PCT Pub. Date: Apr. 17, 2014

(65) Prior Publication Data
US 2015/0282239 A1 Oct. 1, 2015

(51) Int. Cl.
*H04W 76/02* (2009.01)
*H04W 16/32* (2009.01)
(Continued)

(52) U.S. Cl.
CPC ......... *H04W 76/025* (2013.01); *H04W 16/32* (2013.01); *H04W 24/10* (2013.01);
(Continued)

(58) Field of Classification Search
CPC .................................................. H04W 76/025
See application file for complete search history.

(56) References Cited

U.S. PATENT DOCUMENTS 9,398,517 B2 * 7/2016 Faccin .................. H04W 48/08
2009/0270099 A1 * 10/2009 Gallagher ............... H04W 8/08
455/435.1

(Continued)

FOREIGN PATENT DOCUMENTS

WO WO-2011/123464 10/2011

OTHER PUBLICATIONS

Office Action for German Patent Application No. 11 2012 006 984.6, dated Sep. 20, 2016, 8 pages.
(Continued)

*Primary Examiner* — Andrew Lai
*Assistant Examiner* — Andrew C Lee
(74) *Attorney, Agent, or Firm* — Foley & Lardner LLP (57) ABSTRACT

A method, apparatus, and computer program product are provided to manage the establishment of a dual connection. A method according to an example embodiment may include causing a dual connection setup request message to be transmitted to a local area access point (LAAP) and causing a dual connection command to be transmitted to a user equipment (UE). The method further includes receiving a dual connection establishment complete message and causing resources associated with one or more split bearers to be released or suspended.

17 Claims, 4 Drawing Sheets

(51) Int. Cl.
*H04W 24/10* (2009.01)
*H04W 36/04* (2009.01)
*H04W 72/04* (2009.01)
*H04W 76/04* (2009.01)
*H04W 76/06* (2009.01)
*H04W 88/10* (2009.01)

(52) U.S. Cl.
CPC ......... *H04W 36/04* (2013.01); *H04W 72/042* (2013.01); *H04W 76/021* (2013.01); *H04W 76/046* (2013.01); *H04W 76/066* (2013.01); *H04W 88/10* (2013.01)

(56) References Cited

U.S. PATENT DOCUMENTS

| | | | |
|---|---|---|---|
| 2011/0019644 A1 | 1/2011 | Cheon et al. | |
| 2011/0082937 A1* | 4/2011 | Barbaresi | H04W 36/14 709/226 |
| 2011/0134831 A1 | 6/2011 | Pirskanen | |
| 2011/0171953 A1* | 7/2011 | Faccin | H04W 48/08 455/426.1 |
| 2011/0228750 A1* | 9/2011 | Tomici | H04W 8/082 370/338 |
| 2011/0268085 A1* | 11/2011 | Barany | H04W 36/0033 370/331 |
| 2011/0275374 A1 | 11/2011 | Narasimha et al. | |
| 2011/0294474 A1* | 12/2011 | Barany | H04W 8/005 455/414.1 |
| 2012/0038521 A1 | 2/2012 | Zhu | |
| 2012/0039213 A1* | 2/2012 | Cheng | H04W 76/022 370/254 |
| 2012/0071168 A1* | 3/2012 | Tomici | H04W 76/025 455/445 |
| 2012/0071190 A1* | 3/2012 | Choi | H04L 5/0037 455/517 |
| 2012/0071200 A1* | 3/2012 | Bienas | H04W 48/20 455/525 |
| 2012/0166618 A1* | 6/2012 | Dahod | H04L 47/20 709/224 |
| 2012/0189016 A1* | 7/2012 | Bakker | H04W 76/021 370/401 |
| 2012/0300750 A1* | 11/2012 | Chin | H04W 36/0022 370/331 |
| 2012/0329448 A1* | 12/2012 | Lim | H04W 92/20 455/422.1 |
| 2013/0083783 A1* | 4/2013 | Gupta | H04W 28/0215 370/338 |
| 2013/0115949 A1* | 5/2013 | Centonza | H04W 36/245 455/436 |
| 2013/0137469 A1* | 5/2013 | Schmidt | H04W 74/006 455/466 |
| 2013/0183971 A1* | 7/2013 | Tamaki | H04W 36/0061 455/436 |
| 2014/0153489 A1* | 6/2014 | Perras | H04W 60/00 370/328 |

OTHER PUBLICATIONS

3GPP TS 36.300 V10.5.0 (Sep. 2011); Evolved Universal Terrestrial Radio Access (E-UTRA) and Evolved Universal Terrestrial Radio Access Network (E-UTRAN); Overall Description; Stage 2 (Release 10).
International Search Report for PCT/CN2012/082546 dated Jul. 18, 2013.
Written Opinion of the International Searching Authority for PCT/CN2012/082546 dated Jul. 18, 2013.
International Preliminary Report on Patentability for PCT/CN2012/082546 dated Apr. 8, 2015.

* cited by examiner

METHOD AND APPARATUS FOR MANAGING DUAL CONNECTION ESTABLISHMENT

RELATED APPLICATIONS

This application is the U.S. National Stage of and claims the benefit of International Patent Application Number PCT/CN2012/082546, filed Oct. 8, 2012, the entire contents of which are incorporated herein by reference for all purposes.

TECHNOLOGICAL FIELD

An example embodiment of the present invention relates generally to wireless networks and, more particularly, to managing dual connection establishment.

BACKGROUND

Due to booms in the demand for wireless interne access, demands on wireless networks, such as cellular networks, are expected to soar in the foreseeable future. Among the most promising strategies for satisfying this rapidly increasing demand is to reduce the size of network cells. Over the past 50 years, reductions in cell size have increased wireless network capacity by a factor of over 2700. The benefits to network capacity caused by cell size reduction mean that the incorporation of local area (LA) networks into broader network infrastructure may be the next frontier in the evolution of cellular networks, such as Long Term Evolution (LTE) networks.

In this regard, the concept of "dual connection" has recently emerged as a way to incorporate LAs into cellular networks. The basic idea is to let a user equipment (UE) connect to both a macro access point and a LA access point simultaneously, with the macro access point controlling some connection and signalling aspects, such as mobility functions, while offloading most data transmission to the LA access point. This allows the UE to benefit from the high data rate and low required transmission power provided by the LA cell due to its small distance. The concept of dual connection is also referred to as inter-eNB CA (inter-enhaced Node B Carrier Aggregation), User/Control (U/C) plane split, multi-stream, etc. Although dual connection is a promising concept, it is yet unclear how dual connections may most effectively be established.

BRIEF SUMMARY

A method, apparatus and computer program product are therefore provided according to an example embodiment in order to manage dual connection establishment. In this regard, the method, apparatus, and computer program product of an example embodiment may allow a macro access point (MAP) in connection with a user equipment (UE) to initiate and manage the establishment of a dual connection between the UE and both the MAP and a local area access point (LAAP).

In one embodiment, a method is provided that includes causing a dual connection message to be transmitted, causing a dual connection command to be transmitted to a UE, receiving a dual connection establishment complete message, and causing resources associated with one or more split bearers to be released or suspended.

In a further embodiment, an apparatus is provided that includes at least one processor and at least one memory storing program code instructions therein, the memory and program code instructions being configured to, with the processor, cause the apparatus to at least cause a dual connection message to be transmitted, cause a dual connection command to be transmitted to a UE, receive a dual connection establishment complete message, and cause resources associated with one or more split bearers to be released or suspended In a further embodiment, a computer program product is provided that includes a non-transitory computer readable medium storing computer program code portions therein, the computer program code portions being configured to, upon execution, cause an apparatus to at least cause the apparatus to at least cause a dual connection message to be transmitted, cause a dual connection command to be transmitted to a UE, receive a dual connection establishment complete message, and cause resources associated with one or more split bearers to be released or suspended.

In yet another embodiment, an apparatus is provided that includes means for causing a dual connection message to be transmitted, means for causing a dual connection command to be transmitted to a UE, means for receiving a dual connection establishment complete message, and means for causing resources associated with one or more split bearers to be released or suspended.

BRIEF DESCRIPTION OF THE DRAWINGS

Having thus described certain example embodiments of the present disclosure in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

Figure 1:
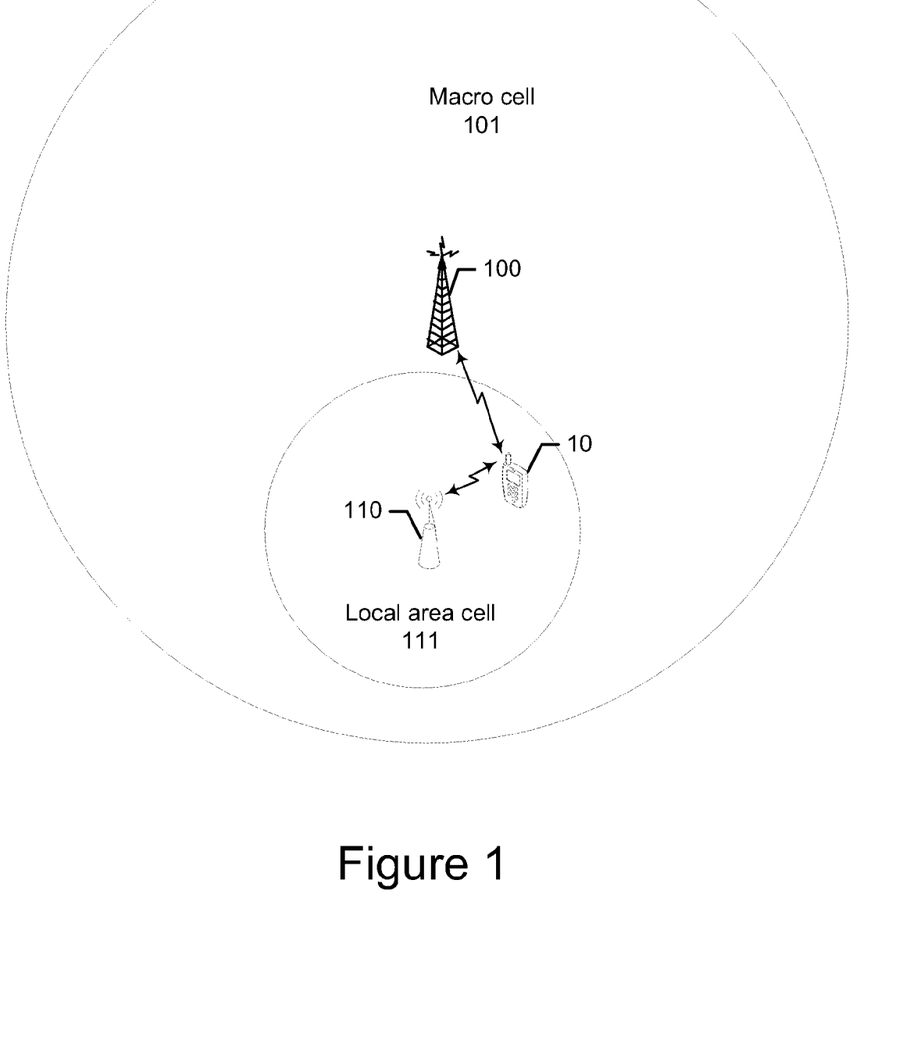
FIG. 1 is an illustration of a dual connection system which may benefit from embodiments of the present invention.

Referring now to FIG. 1, a system supporting dual connection is depicted. As depicted, during dual connection a user equipment (UE), such as UE 10, may be in communication with, e.g., connected to, both a macro access point (MAP) 100, which serves a macro cell 101, and a local access point (LAAP) 110, which supports a local area cell 111. As shown, a macro cell may cover a larger area than local cells, and may even overlap with or encompass one or more local cells. The system depicted in FIG. 1 may support communications between a user equipment, such as the user equipment 10, and a network, such as a Universal Mobile Telecommunications System (UMTS) network, a Long Term Evolution (LTE) network, an LTE-Advanced (LTE-A) network, a Global Systems for Mobile communications (GSM) network, a Code Division Multiple Access (CDMA) network, e.g., a Wideband CDMA (WCDMA) network, a CDMA2000 network or the like, a Frequency-Division Multiplexing (FDM) network, e.g., an Orthogonal Frequency-Division Multiplexing (OFDM) network, a General Packet Radio Service (GPRS) network or other type of network, via one or more access points, such as MAP 100 and/or LAAP 110.

As used herein, an access point refers to any communication device which provides connectivity to a network, such as a base station, an access node, or any equivalent, such as a Node B, an evolved Node B (eNB), a relay node, or other type of access point. The term "user equipment" (UE) includes any mobile communication device such as, for example, a mobile telephone, portable digital assistant (PDA), pager, laptop computer, a tablet computer, or any of numerous other hand held or portable communication devices, computation devices, content generation devices, content consumption devices, data card, Universal Serial Bus (USB) dongle, or combinations thereof. The communications between the UE 10 and any of the access points 100, 110 may include the transmission of data via an uplink that is granted between the user equipment 10 and the access point 100, 110.

Figure 2:
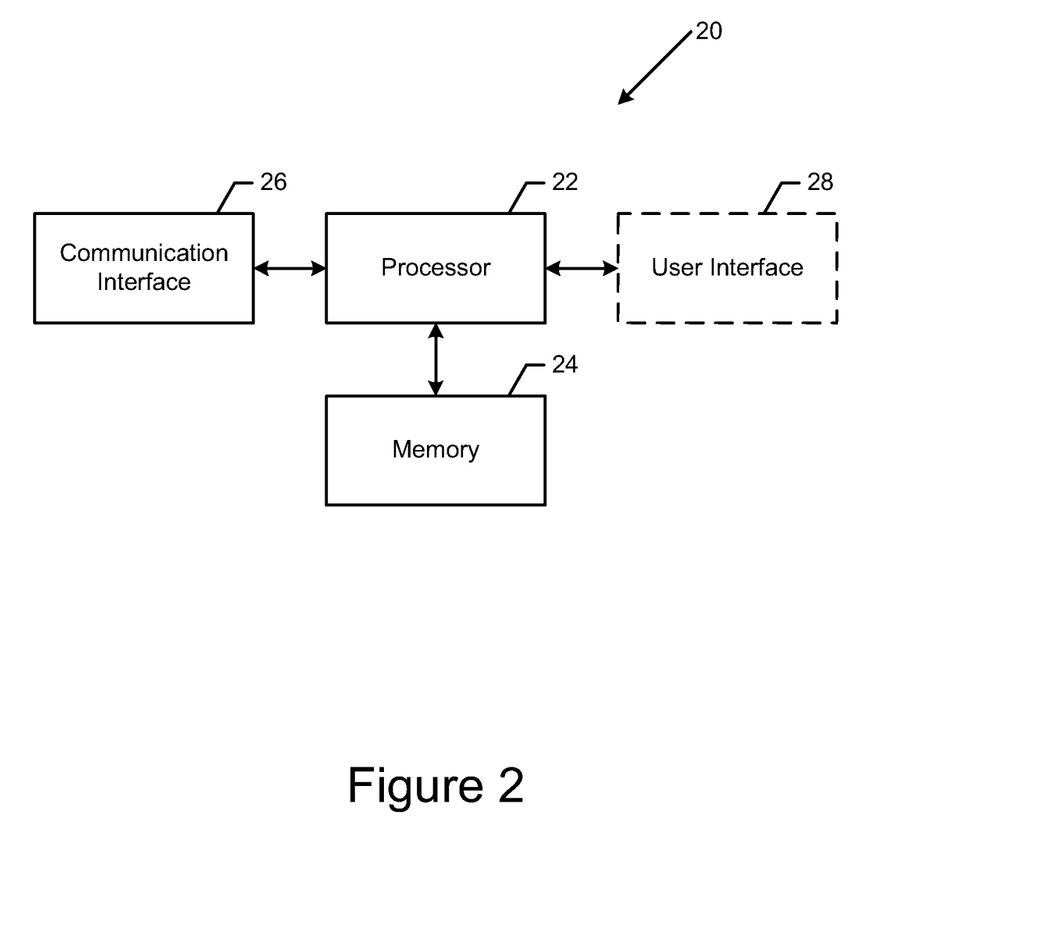
FIG. 2 is a block diagram of an apparatus that may be configured in accordance with an example embodiment of the present invention.

The user equipment 10 as well as access points 100, 110 may embody or otherwise be associated with an apparatus 20 that is generally depicted in FIG. 2 and that may be configured in accordance with an example embodiment of the present invention as described below. However, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with a processing system including processing circuitry, such as the processor 20 and, in some embodiments, the memory 24, which is configurable to perform actions in accordance with example embodiments described herein. The processing circuitry may be configured to perform data processing, application execution and/or other processing and management services according to an example embodiment of the present invention. In some embodiments, the apparatus or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry may include a processor 22 and memory 24 that may be in communication with or otherwise control a communication interface 26 and, in some cases in which the apparatus is embodied by the user equipment 10, a user interface 28. As such, the processing circuitry may be embodied as a circuit chip (e.g., an integrated circuit chip) configured (e.g., with hardware, software or a combination of hardware and software) to perform operations described herein. However, in some embodiments taken in the context of the user equipment 10 or an access point 100, 110, 120, the processing circuitry may be embodied as a portion of user equipment or the access point.

The user interface 28 (if implemented in embodiments of the apparatus 20 embodied by the user equipment 10) may be in communication with the processing circuitry to receive an indication of a user input at the user interface and/or to provide an audible, visual, mechanical or other output to the user. As such, the user interface 28 may include, for example, a keyboard, a mouse, a joystick, a display, a touch screen, a microphone, a speaker, and/or other input/output mechanisms.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network and/or any other device or module in communication with the processing circuitry, such as between the user equipment 10 and an access point 100, 110, 120. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 24 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 22. Additionally or alternatively, the memory could be configured to store instructions, e.g., program code portions, for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 22 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 24 or otherwise accessible to the processor. As such, whether configured by hardware or by a combination of hardware and software, the processor may represent an entity (e.g., physically embodied in circuitry—in the form of processing circuitry) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

Figure 3:
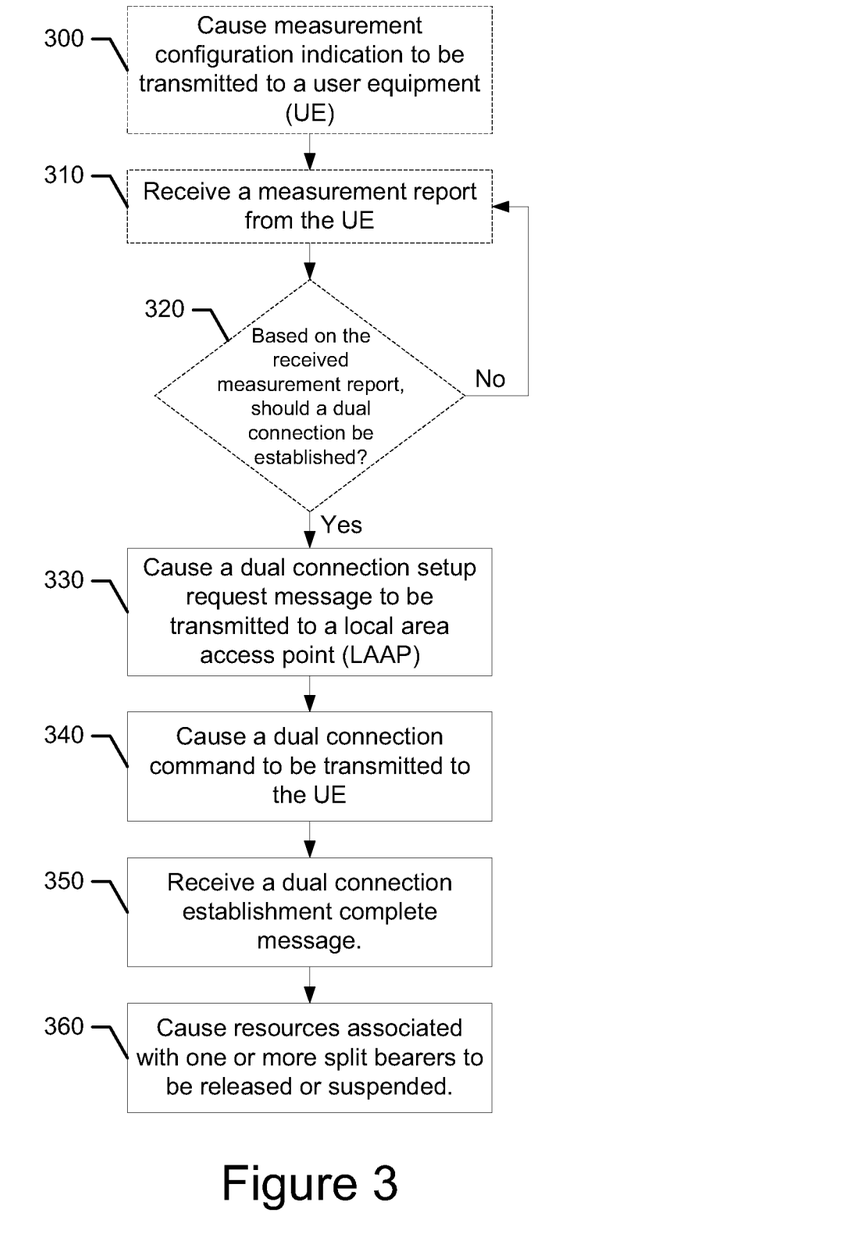
FIG. 3 is a flowchart depicting the operations performed by an apparatus embodied by or otherwise associated with a macro access point.

FIG. 3 is a flowchart illustrating operations performed by a method, apparatus and computer program product, such as apparatus 20 of FIG. 2 in accordance with example embodiments of the present invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions, e.g., program code portions. In this regard, the computer program instructions which embody the procedures described above may be stored by a memory 24 of an apparatus employing an embodiment of the present invention and executed by a processor 22 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3 and 4, when executed, convert a computer or processing circuitry into a particular machine configured to perform an example embodiment of the present invention. Accordingly, the operations of FIG. 4 define an algorithm for configuring a computer or processing circuitry, e.g., processor, to perform an example embodiment. In some cases, a general purpose computer may be provided with an instance of the processor which performs the algorithms of FIG. 3 or 5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included. It should be appreciated that each of the modifications, optional additions or amplifications below may be included with the operations above either alone or in combination with any others among the features described herein.

As noted in the Background section, dual connection is a promising solution to enhancing wireless network capacity and robustness. However, there is currently no defined procedure for establishing a dual connection when a UE, such as UE 10, is connected to a macro access point (MAP) 100 and is also in range of a local area access point (LAAP). The most similar scenario to dual connection may be carrier aggregation (CA). With CA, if an access point serving a primary cell needs to enhance the data rate for a given UE, it may configure a secondary cell so that the UE can connect to both the primary cell and secondary cell simultaneously. However, with CA, the access point for the primary cell and secondary cell is the same access point, meaning tight control over both the primary cell and secondary cell is available. In a dual connection scenario, the MAP and LAAP are independent Aps. While an X2/X3 interface may be provided between the MAP and LAP, the MAP may not exert the same type of tight control over the LAAP as the primary access point may exert over the secondary cell in the CA scenario. This makes applying CA configuration procedures unsuitable for establishing dual connections.

Accordingly, example embodiments for managing the establishment of dual connections will now be discussed with reference to FIGS. 3 and 4. In this regard, the flowchart contained in FIG. 3, along with its accompanying discussion, highlights particular operations performed by an apparatus, such as the apparatus 20 depicted in FIG. 2, embodied by or otherwise associated with a MAP, such as the MAP 100 depicted in FIG. 1. Details regarding these operations and their associated signals will be further provided in the discussion accompanying FIG. 4.

Figure 4:
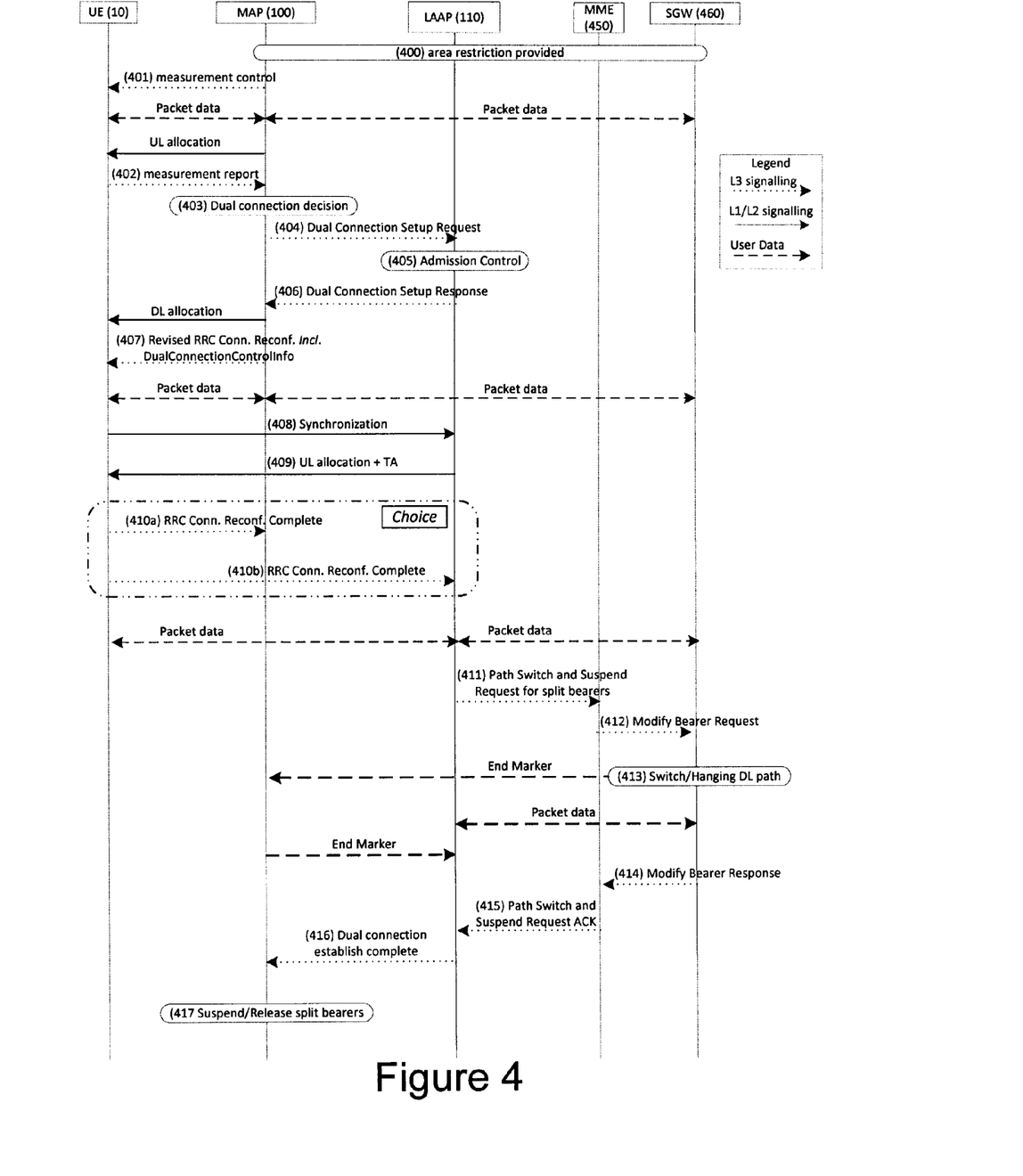
FIG. 4 is a signaling diagram illustrating operations performed in accordance with an embodiment of the present invention.

Before proceeding, it will also be understood that FIG. 4, along with its accompanying discussion, illustrates additional operations which may be performed by one or more apparatuses, such as the apparatus 20 depicted in FIG. 2, which may be associated with various other network entities. In this regard, each of the UE 10, MAP 100, LAAP 110, Mobility Management Entity (MME) 450, and Serving Gateway (SGW) 460 depicted in FIGS. 1 and/or 4 may have a respective apparatus, such as the apparatus 20 depicted in FIG. 2, embodied by or otherwise associated therewith, and including means, such as the processing circuitry, the processor 22, the communications interface 26 or the like, for causing their respective network entities to carry out the operations depicted in FIG. 4, (e.g., for causing their respective associated network entities to transmit and/or receive the depicted signals), as will be described below.

Turning first to FIG. 3, an example embodiment for managing the establishment of a dual connection will now be described. In this regard, an apparatus 20 embodied by or otherwise associated with a MAP, such as the MAP 100 depicted in FIG. 1, or a LAAP, such as the LAAP 110 depicted in FIG. 1, may include means, such as the processing circuitry, the processor 22, the communications interface 26 or the like, for causing a measurement configuration indication to be transmitted to a UE, such as UE 10. See operation 300 of FIG. 3. The measurement configuration indication may, for example, include an indication that measurements are to be performed at least on local area cells, such as at least local area cell 111. Thus, the apparatus 20 may further include means, such as those just described, for receiving at least one measurement report from the UE 10. See operation 310. For example, the UE may transmit one measurement report including information regarding measurements performed on one or more LA cells. According to another example embodiment, the UE may transmit multiple measurement reports, each including information regarding measurements performed on a single LA cell.

The apparatus 20 may further include means, such as those described above, for determining, based on the at least one received measurement report, whether a dual connection should be established. See operation 320. Determining whether a dual connection should be established may further include determining which LA cell to cause the dual connection to be established with, if the one or more measurement report(s) received from the UE contained information regarding measurements performed on multiple LA cells. For example, the apparatus 20 may include means, such as those described above, for determining, based on information contained in the one or more measurement reports, which of two or more LAAPs to cause the UE to establish a dual connection with. This determination may, for example, be based on measurement results such as the Reference Signal Received Power (RSRP) and/or Reference Signal Received Quality (RSRQ) of the two or more LA cells. Other factors which the determination may be based on may include, for example, macro cell load and/or traffic types. In an instance in which it is determined that a dual connection should not be established, the apparatus may, for example, receive one or more further measurement reports and similarly determine, based on those measurement reports, whether a dual connection should then be established. Conversely, the apparatus may proceed with the operations described below in an instance in which it is determined that a dual connection should be established, so as to cause a dual connection involving the determined LAAP to be established.

In this regard, the apparatus 20 may further include means, such as the processing circuitry, the processor 22, the communications interface 26 or the like, for causing a dual connection setup message to be transmitted. See operation 330. According to embodiments in which the apparatus 20 is embodied by or otherwise associated with a MAP that is managing the dual connection establishment procedure, the dual connection setup message may be transmitted to the LAAP 110. According to embodiments in which the apparatus 20 is embodied by or otherwise associated with a LAAP, the dual connection setup message may be transmitted to the MAP 100. The apparatus 20 may further include means, such as those just mentioned above, for causing a dual connection command to be transmitted to the UE 10. See operation 340. The apparatus 20 may further include means, such as those discussed above, for receiving a dual connection establishment complete message. See operation 350. The dual connection establishment complete message may be received, for example, from either the LAAP 110 or the MME 450. The dual connection establishment complete indication may, for example, be received via an X2/X3 interface if it is received from the LAAP 110, or via an S1 interface if it is received from the MME. The apparatus 20 may also include means, such as those discussed above, for causing resources associated with one or more split bearers to be released or suspended. See operation 360. For example, the apparatus embodied by or otherwise associated with the MAP 100 may cause radio and/or C-plane related resources associated with split bearer(s) for the UE 10 to be released or suspended.

Thus, having described, from the perspective of an apparatus embodied by or otherwise associated with a MAP or LAAP, some of the operations of example embodiments in which a MAP manages the establishment of a dual connection, these operations, as well as others carried out by additional network entities, will now be discussed in further detail with reference to the signaling diagram depicted in FIG. 4. In the following description, the various network entities, such as the MAP 100, LAAP 110, etc. will be described as performing various operations. However, it will be understood that this is merely for the sake of brevity, and that the various operations may in fact be performed by respective apparatuses, such as the apparatus 20 depicted in FIG. 2, embodied by or otherwise associated with the respective network entities and including means, such as the processing circuitry, the processor 22, the communications interface 26 or the like, for carrying out the described operations. In this regard, reference will now be made to numbered operations 400-417:

At operation 400, area restriction information may be provided. For example, a UE context may be provided which includes information regarding roaming restrictions. Information regarding the UE context, such as the area restriction information, may, for example, be stored at MAP 100 and may be provided, for example, either at connection establishment or during a Timing Advance (TA) update.

At operation 401, the MAP 100 may configure UE measurement procedures according to the area restriction information and may transmit a measurement configuration indication to the UE 10. The measurement configuration indication may, for example, contain one or more parameters indicating that measurements are to be performed on LA cells.

At operation 402, the UE 10 may transmit a measurement report. The circumstances under which the UE 10 transmits the measurement report may be set, for example, by system information, a relevant specification, or by any other source. Based on the received measurement configuration, the UE 10 may transmit information regarding measurements performed on one or more LA cells to the MAP, e.g., by transmitting one or more measurement reports, such as a single measurement report containing information regarding measurements performed on multiple LA cells, or multiple measurement reports which each contain information regarding measurements performed on a single LA cell.

At operation 403, the MAP 100 may determine, based on the one or more measurement reports on one or more LA cells, whether to establish a dual connection for the UE 10.

The determination may further be based on, for example, radio resource management (RRM) information. If the one or more measurement reports include information regarding measurements performed on multiple LA cells, the MAP 100 may also determine which LA cell the UE should be caused to establish a dual connection with.

At operation 404, the MAP 100 may cause a "dual connection setup request" message to be transmitted to the LAAP 110, e.g., the LAAP that the MAP 100 determined the UE 10 should be caused to establish a dual connection with. The dual connection setup request message may include information necessary to prepare the LAAP 110 for the dual connection. For example, the dual connection setup message may include bearer split information. The bearer split information may, for example, indicate which bearer(s) are to be moved and/or created by the LAAP 110 and may also or alternatively include information such as one or more Evolved Packet System (EPS) bearer ids, one or more radio bearer ids, etc. By providing this bearer split information to the LAAP, the LAAP may setup appropriate data bearers for the UE so that, for example, data transmission may be offloaded from the MAP to the LAP. The dual connection setup request message may also include one or more of: a UE X2 signalling context reference at the MAP 100; a UE S1 Evolved Packet Core (EPC) signalling context reference; a destination cell ID; a $K_{eNB*}$ key; a Radio Resource Control (RRC) context, which may include a Cell Radio Network Temporary Identifier (C-RNTI) of the UE in the MAP 100; Access Stratum (AS) configuration information; E-RAB (EUTRAN Radio Access Bearer) context; physical layer ID of the macro cell 101; and/or short MAC-I (Message Authentication Code for Integrity). The UE X2 and/or UE S1 signalling references may enable the LAAP 110 to address the MAP 100 and the EPC. The E-RAB context may include Radio Network Layer (RNL) and Transport Network Layer (TNL) addressing information, and Quality of Service (QoS) profiles of the E-RABs.

At operation 405, the LAAP 110 may perform Admission Control based on the received E-RAB QoS information, e.g., to increase the likelihood of successfully establishing a dual connection, if the resources can be granted by the LAAP 110. The LAAP 110 may configure the required resources according to the received E-RAB QoS information and may reserve a C-RNTI and optionally a Random Access Channel (RACH) preamble. The AS-configuration to be used in the LA cell 111 can either be specified independently (e.g., it may be "established") or as a delta compared to the AS-configuration used in the macro cell 101 (e.g., it may be a "reconfiguration").

At operation 406, the LAAP 110 may prepare the dual connection with Layer-1/Layer-2 (L1/L2) and may transmit a "dual connection setup request acknowledge (ACK)" message to the MAP 100. The dual connection setup request ACK message may include a transparent container to be sent to the UE as an RRC message to perform the dual connection setup. The container may, for example, include a new C-RNTI, LAAP 110 security algorithm identifiers for the selected security algorithms, a dedicated RACH preamble, and/or other possible parameters, such as access parameters, System Information Blocks (SIBs), etc. The dual connection setup request ACK message may also include RNL/TNL information for the forwarding tunnels, if necessary.

At operation 407, the LAAP 110 may generate an RRC message, such as an RRCConnectionReconfiguration message which may include a DualConnectionControlInfo Information Element (IE), to be transmitted by the MAP 100 to the UE 10. The MAP 100 may perform any necessary integrity protection and ciphering of the message. The UE 10 may receive the RRCConnectionReconfiguration message with necessary parameters (e.g., new C-RNTI, destination LAAP security algorithm identifiers, and/or optionally dedicated RACH preamble, target eNB SIBs, etc.) and may be commanded by the MAP to perform the dual connection establishment. The UE 10 does not need to delay the dual connection establishment for delivering HARQ/ARQ (Hybrid Automatic Repeat Request/Automatic Repeat Request) responses to the MAP 100.

At operation 408, after receiving the RRCConnectionReconfiguration message including the DualConnectionControlInfo IE, the UE 10 may, for example, perform synchronization to the LAAP 110 and access the LA cell 111 via RACH. The synchronization may, for example, follow a contention-free procedure if a dedicated RACH preamble was indicated in the DualConnectionControlInfor, or follow a contention-based procedure if no dedicated preamble was indicated. According to an alternative example embodiment, the UE 10 may perform synchronization via a reserved dedicated UL channel, for example, by directly sending UL signalling on the reserved dedicated UL channel. The UE 10 may derive the LAAP 110 specific keys and configure the selected security algorithms to be used in the LA cell 111.

At operation 409, the LAAP 110 may respond by transmitting UL allocation and timing advance.

At operation 410a, according to one example embodiment, once the UE 10 has successfully accessed the LA cell 111, the UE may transmit the RRCConnectionReconfigurationComplete message, e.g., including C-RNTI, to confirm the dual connection establishment, along with an uplink Buffer Status Report, whenever possible, to the LAAP 110 to indicate that the dual connection establishment procedure is completed for the UE 10. The LAAP 110 may then verify the C-RNTI transmitted in the RRCConnectionReconfigurationComplete message. The LAAP 110 may then begin sending data to the UE 10 for split bearers.

At operation 410b, according to another example embodiment, once the UE 10 has successfully accessed the LA cell 111, the UE may alternatively or additionally send the RRCConnectionReconfigurationComplete message to the MAP 110 to confirm the dual connection establishment procedure is completed for the UE 10.

It should be noted that, for downlink (DL) data, the MAP 100 may continue to transmit DL data to the UE 10 for the one or more split bearers until all data for the one or more split bearers are correctly transmitted to the UE 10. The MAP may determine whether all of the DL data has been transmitted out, for example, based on a data buffer of the MAP. On the other hand, for UL data, the UE may stop UL data transmissions for the one or more split bearers in the macro cell 101 when the UE 10 receives the RRCConnectionReconfiguration message including the DualConnectionControlInfo IE. The UE 10 may then begin UL data transmissions for the one or more split bearers in the LA cell 111 after the UE receives an UL grant from the LAAP 110. By stopping UL transmissions in this way, the MAP 100 may be ensured to receive a complete Packet Data Convergence Protocol (PDCP) Protocol Data Unit (PDU) in case the PDCP PDU is being transmitted when the RRCConnectionReconfiguration is received. Thus, no partially received PDCP PDUs may be left in the buffer of the MAP 100 when transmission moves to the LA cell 111. This may prevent the MAP from needing to forward data and/or transfer PDCP status to the LAAP 110.

It is further noted that, in an instance in which dual connection establishment failure occurs, the UE 10 may return to normal operation, e.g., to a normal single connection with the MAP 100. Dual connection establishment success or failure may be determined by the UE 10, for example, based on whether a Random Access (RA) procedure on the LA cell 110 is successful, e.g., if it is successful within a certain predefined time limit. Thus, if the RA procedure on the LA cell 110 is completed within the predefined time limit, the UE 10 may determine that the dual connection establishment was successful, while if the RA procedure is not completed on the LA cell 110 within the predefined time limit, the UE 10 may determine that the dual connection establishment failed. According to another example embodiment, dual connection establishment success or failure may be determined based on whether the UE receives positive feedback for the RRCConnectionReconfigurationComplete message. Thus, for example, if positive feedback for the RRCConnectionReconfigurationComplete message is received within a predefined time limit, the UE 10 may determine that dual connection establishment was successful, while if positive feedback for the RRCConnectionReconfigurationComplete message is not received within the predefined time limit, the UE 10 may determine that dual connection establishment failed.

At operation 411, in an instance in which the handover was successful, the LAAP 110 may send a "path switch/suspend request" message to an MME 450 to inform that the UE 10 has setup a dual connection. The path switch/suspend request message may further include split bearer information, such as information indicating one or more bearers of the UE 10 that have moved to the LAAP 110.

At operation 412, the MME 450 may transmit a "modify bearer request" message to the serving gateway (SGW) 460. The modify bearer request message may include split bearer information, such as information indicating one or more bearers of the UE 10 that have moved to the LAAP 110.

At operation 413, the SGW may then switch the DL data path for split bearers to the LA cell 110 side. The SGW 460 may then send one or more "end marker" packets via the old path to the MAP and then can release or suspend, e.g., hang, any U-plane/TNL resources of split bearers towards the MAP. The MAP 100 may, according to an example embodiment, suspend/hang the one or more split bearers upon receiving the end marker from the SGW. The MAP 100 may further send the end marker to the LAAP 110.

At operation 414, the SGW 460 may send a "modify bearer response" message to the MME 450. The modify bearer response message may indicate that the split bearer path has been changed completely.

At operation 415, the MME 450 may confirm the path switch/suspend request message by transmitting a "path switch/suspend request ACK" message to the LAAP 110.

At operation 416, the LAAP 110 may transmit a "dual connection establishment complete" message to the MAP 100, which informs the MAP 100 of the successful dual connection establishment and triggers the release or suspension/hanging of resources for split bearers by the MAP 100. The LAAP 110 may, according to an example embodiment, send this message after receiving a path switch/suspend request message from the MME 450.

At operation 417, upon reception of the dual connection establishment complete message, the MAP 100 may release or suspend/hang radio and C-plane related resources associated with the one or more split bearers for the UE 10.

All of the example embodiments described above may, for example, provide mechanisms for managing the establishment of a dual connection. Example embodiments may provide dual connection establishment procedures which may be implemented without requiring substantial revisions to existing network setups.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
   transmitting, by a macro access point to a first local area access point, a dual connection setup message;
   receiving, by the macro access point, a dual connection setup request acknowledgement message from the first local area access point, the dual connection setup request acknowledgement message containing a radio resource control (RRC) message to be retransmitted by the macro access point to a user equipment (UE);
   transmitting, by the macro access point to the UE, a dual connection command comprising the RRC message received from the local area access point;
   receiving, by the macro access point from a mobile management entity (MME), a dual connection establishment complete message; and
   releasing or suspending resources associated with one or more split bearers, responsive to receipt of the dual connection establishment complete message.

2. The method of claim 1, further comprising, before transmitting the dual connection setup message:
   transmitting, by the macro access point to the UE, a measurement configuration indication,
   receiving, by the macro access point, one or more measurement reports from the UE, and
   determining, by the macro access point, based on a measurement report identifying the first local area access point exceeding a threshold, that a dual connection should be established with the first local area access point.

3. The method of claim 2, wherein the one or more measurement reports comprise information regarding measurements performed on a plurality of local area cells being respectively served by a plurality of local area access points including the first local area access point; and
   wherein determining that a dual connection should be established with the first local area access point further comprises selecting, based on the one or more measurement reports indicating that a measurement for the first local area access point exceeds measurements for other local area access points of the plurality of local access points, the first local area access point.

4. The method of claim 1, wherein the dual connection setup message includes bearer split information.

5. The method of claim 4, wherein the bearer split information includes one or more Evolved Packet System (EPS) bearer identifiers or one or more radio bearer identifiers.

6. The method of claim 4, wherein the bearer split information includes or further includes information regarding which one or more bearers are to be moved or created by the first local area access point.

7. The method of claim 1, wherein the dual connection command comprises a DualConnectionControlInfo information element.

8. The method of claim 1, wherein the dual connection command is included in an RRCConnectionReconfiguration message.

9. The method of claim 1, further comprising:
transmitting downlink (DL) data to the UE for the one or more split bearers;
determining that all DL data for the one or more split bearers have been correctly transmitted to the UE; and
terminating transmission of the DL data to the UE for the one or more split bearers, responsive to the determination.

10. The method of claim 1, wherein the resources comprise radio and C-plane related resources.

11. The method of claim 1, further comprising receiving, by the macro access point, an RRCConnectionReconfigurationComplete message from the UE.

12. The method of claim 1, further comprising receiving, by the macro access point, the dual connection establishment complete message from the first local area access point via an X2/X3 interface.

13. The method of claim 1, further comprising receiving, by the macro access point, the dual connection establishment complete message from the mobility management entity (MME) via an S1 interface.

14. The method of claim 1, further comprising receiving, by the macro access point, an end marker from a serving gateway (SGW); and
wherein releasing or suspending the resources associated with the one or more split bearers further comprises releasing or suspending the resources associated with the one or more split bearers in response to receiving the end marker from the SGW.

15. An apparatus, comprising:
at least one processor and at least one memory storing program code instructions, the memory and program code instructions being configured to, with the processor, cause the apparatus to at least:
transmit, to a first local area access point, a dual connection setup message;
receive, from the first local area access point, a dual connection setup request acknowledgement message, the dual connection setup request acknowledgement message containing a radio resource control (RRC) message to be retransmitted by the macro access point to a user equipment (UE);
transmit, to the UE, a dual connection command comprising the RRC message received by the first local area access point;
receive, from a mobile management entity (MME), a dual connection establishment complete message; and
release or suspend resources associated with one or more split bearers.

16. The apparatus of claim 15, wherein the apparatus is further caused to, before transmitting the dual connection setup message:
transmit, to the UE, a measurement configuration indication,
receive one or more measurement reports from the UE, and
determine, based on a measurement report identifying the first local area access point exceeding a threshold, that a dual connection should be established.

17. The apparatus of claim 16, wherein the one or more measurement reports comprise information regarding measurements performed on a plurality of local area cells being respectively served by a plurality of local area access points including the first local area access point; and
wherein the apparatus being caused to determine that a dual connection should be established with the first local area access point comprises selecting, based on the one or more measurement reports indicating that a measurement for the first local area access point exceeds measurements for other local area access points of the plurality of local access points, the first local area access point.

* * * * *